(12) United States Patent
Fitzgerald

(10) Patent No.: US 8,254,151 B2
(45) Date of Patent: Aug. 28, 2012

(54) POWER SUPPLY

(75) Inventor: William Vincent Fitzgerald, Zionsville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 138 days.

(21) Appl. No.: 12/450,453

(22) PCT Filed: May 25, 2007

(86) PCT No.: PCT/US2007/012440
§ 371 (c)(1),
(2), (4) Date: Sep. 25, 2009

(87) PCT Pub. No.: WO2008/147351
PCT Pub. Date: Dec. 4, 2008

(65) Prior Publication Data
US 2010/0067260 A1  Mar. 18, 2010

(51) Int. Cl.
H02H 7/122 (2006.01)
(52) U.S. Cl. ....................... 363/56.1; 363/131
(58) Field of Classification Search .............. 363/131, 363/56.01, 50
See application file for complete search history.

(56) References Cited

U.S. PATENT DOCUMENTS

| | | | |
|---|---|---|---|
| 3,840,798 A * | 10/1974 | Burchall et al. | 363/17 |
| 3,873,846 A | 3/1975 | Morio et al. | |
| 4,037,271 A | 7/1977 | Keller | |
| 4,208,705 A | 6/1980 | Hosoya | |
| 4,228,493 A | 10/1980 | De Sartre et al. | |
| 4,253,137 A | 2/1981 | Rao | |
| 4,276,586 A | 6/1981 | Boekhorst | |
| 4,327,404 A | 4/1982 | Horiguchi | |
| 4,413,313 A | 11/1983 | Robinson | |
| 4,481,564 A | 11/1984 | Balaban | |
| 4,486,822 A | 12/1984 | Marinus | |
| 4,488,210 A | 12/1984 | Shono | |
| 4,535,399 A | 8/1985 | Szepesi | |
| 4,593,347 A | 6/1986 | Peruth et al. | |
| 4,630,186 A | 12/1986 | Kudo | |
| 4,845,605 A | 7/1989 | Steigerwald | |
| 4,882,663 A * | 11/1989 | Nilssen | 363/131 |
| 4,885,671 A | 12/1989 | Peil | |

(Continued)

FOREIGN PATENT DOCUMENTS

EP  0043761  8/1984

(Continued)

OTHER PUBLICATIONS

Unitrode Integrated Circuits Data and Applications Handbook: "High Speed PWM Controller," Apr. 1990, pp. 4-120-4-127.

(Continued)

*Primary Examiner* — Shawn Riley
(74) *Attorney, Agent, or Firm* — Robert D. Shedd; Vincent E. Duffy; James McKenzie

(57) ABSTRACT

In a switched mode power supply, and in accordance with a method for operating a switched mode power supply, the magnitude of each occurrence of a current flowing during operation of a power output switch is sensed for negative feedback control. A sense voltage is generated proportional to the primary supply voltage. Whenever the sense voltage exceeds a threshold, output power of the power supply is limited by increasing the sensed magnitude of each occurrence of the flowing currents by adding to each sensed magnitude a voltage proportional to the sense voltage. Threshold voltages can be selected by using Zener diodes having different breakdown voltages. Respective ranges within the overall range of the primary supply voltage in which supplemental power limiting occurs and does not occur can thus be controlled.

11 Claims, 3 Drawing Sheets

U.S. PATENT DOCUMENTS

| | | |
|---|---|---|
| 4,903,182 A | 2/1990 | Pilukaitis et al. |
| 4,930,060 A | 5/1990 | Leonardi |
| 5,066,900 A | 11/1991 | Bassett |
| 5,171,949 A | 12/1992 | Fujishima et al. |
| 5,267,133 A | 11/1993 | Motomura et al. |
| 5,442,539 A | 8/1995 | Cuk et al. |
| 5,453,921 A | 9/1995 | Shutts |
| 5,515,263 A | 5/1996 | Otake et al. |
| 5,570,278 A | 10/1996 | Cross |
| 5,581,451 A | 12/1996 | Ochiai |
| 5,815,381 A * | 9/1998 | Newlin .................. 363/17 |
| 5,838,556 A | 11/1998 | Yokoyama |
| 5,841,642 A | 11/1998 | Fitzgerald |
| 6,721,192 B1 | 4/2004 | Yang et al. |

FOREIGN PATENT DOCUMENTS

| | | |
|---|---|---|
| EP | 0049633 | 7/1985 |
| EP | 0086521 | 8/1985 |
| EP | 0091133 | 9/1986 |
| FR | 2460579 | 1/1982 |
| FR | 2575617 | 7/1986 |
| JP | 641386 | 5/1994 |
| JP | 8340672 | 12/1996 |

OTHER PUBLICATIONS

Brown: "4.4 Designing the Resonant Tank Circuit," Power Supply Cookbook, 1994, p. 137.

Fritz et al.:"Current-sensing IC Improves Regulation of Power Supplies", Electronic Products, Power Supplies, Jun. 17, 1985, pp. 77-82.

Jovanovic et al.: "Zero-Voltage Technique in High-Frequency Off-Line Converters", 1988 IEEE, pp. 23-32.

Kitajima et al.:"Reduction of Power Loss in Voltage Resonant Converter", NEC Corporation, Intelec'91 (Nov. 1991), pp. 145-150.

Liu et al.:"Resonant Switches—A Unified Approach to Improve Performances of Switching Converters", Virginia Polytechnic Institute, 1984 IEEE, pp. 344-351.

Liu et al.:"Zero-Voltage Switching Technique in DC/DC Converters", IEEE Transactions on Power Electronics, vol. 5, No. 3, Jul. 1990, pp. 293-304.

Samsung Electronics.:"Linear Integrated Circuits", Current-Mode PWM Controllers, KA3842B/3B/4B/5B, pp. 822-828.

International Search Report, dated Feb. 29, 2008.

* cited by examiner

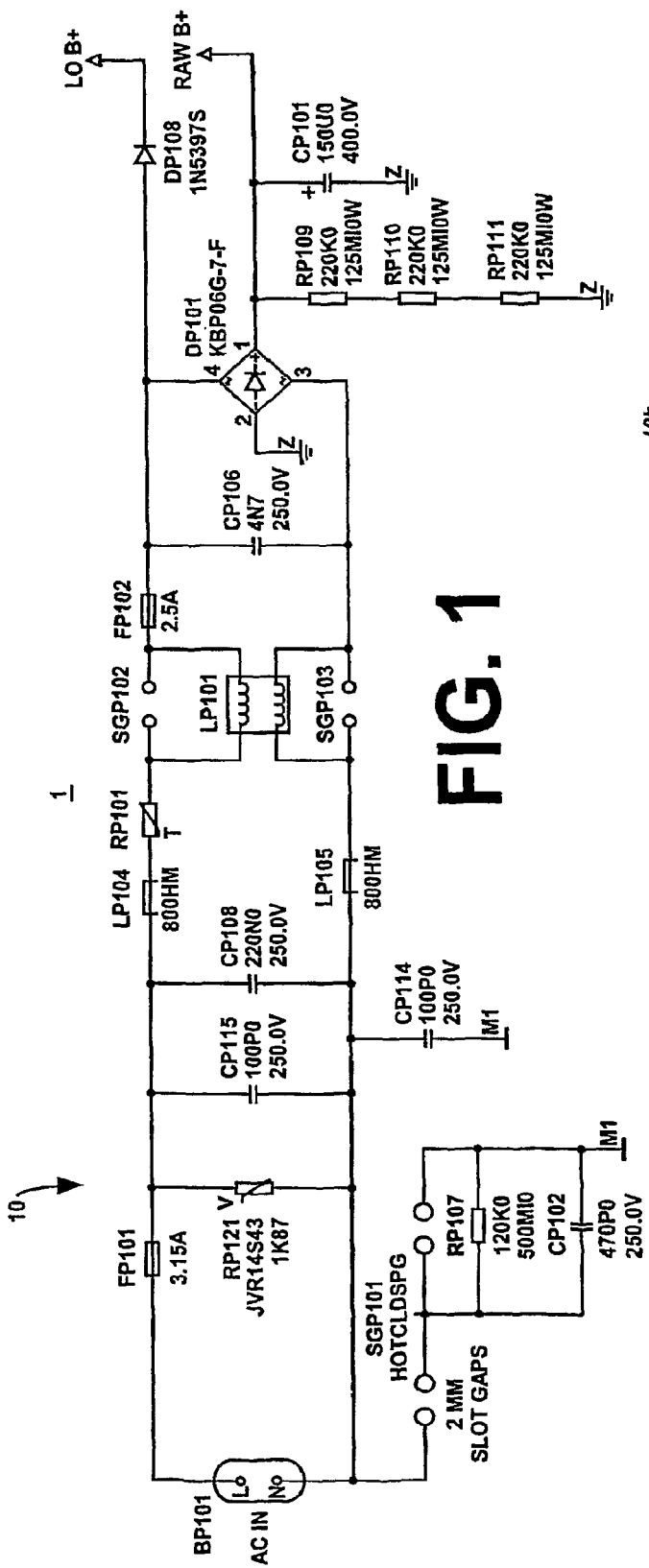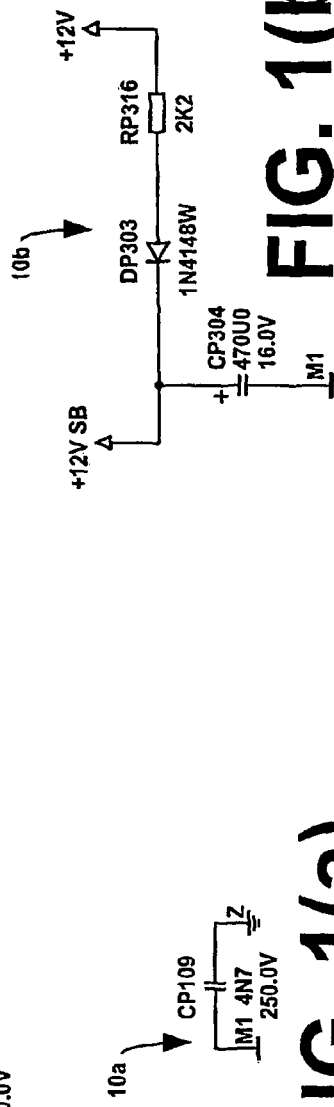
FIG. 1
FIG. 1(a)
FIG. 1(b)

POWER SUPPLY

This application claims the benefit, under 35 U.S.C. §365 of International Application PCT/US2007/012440, filed May 25, 2007 which was published in accordance with PCT Article 21(2) on Dec. 4, 2008 in English.

BACKGROUND OF THE INVENTION

A current mode controlled switched mode power supply according to the inventive arrangements limits the power output of the power supply over a wide over a wide input AC voltage range, in a manner that enables selection of a threshold, for example a voltage threshold, at which the power limiting begins.

Switching power supplies that utilize current mode control provide a maximum power output that is proportional to the input voltage. In a power supply intended for use over a wide voltage input range, excessive power during overloads can be delivered at the high range of the input AC voltage, which can result in high operating temperatures for transformers, diodes and transistors in the power supply.

If no power limiting is used in such a power supply, the components in the power supply must be designed to handle the maximum output power during overload, at the highest input voltage, and without overheating or failing. Utilizing more robust parts adds unnecessary cost and makes the power supply physically larger than if the parts were designed only for an intended or fixed power output in a narrower range of input AC voltage.

An existing current mode controlled switched mode power supply teaches in part a circuit that generates an offset voltage that can be added to a voltage indicative of the operating current of the output switching transistor of the power supply. The offset voltage increases the magnitude of the feedback the voltage. Accordingly, power limiting begins at a lower input AC voltage than would otherwise occur absent the offset.

The existing power supply solved a number of problems, but its operation presented an opportunity for further improvement. One such problem that was so raised is that the magnitude of the offset voltage was directly proportional to a DC voltage that was, in turn, directly proportional to the magnitude of the input AC voltage. Thus, there was no control over the input AC voltage level at which the power limiting was initiated. Power limiting always occurred even at lower output power levels when power limiting may not have been necessary, because it was not possible to establish a threshold within the input AC voltage range for initiating the power limiting. Establishing a threshold for initiating power limiting advantageously makes it possible to improve the design and operation of the power supply, for example based upon appropriate performance criteria. Such performance criteria can include, for example, optimizing: the input voltage range of the power supply; the maximum load capability of the power supply; the cost of the power supply; the size of the power supply; and, the efficiency of operation of the power supply.

This problem and others are solved in accordance with the inventive arrangements taught herein by providing a selectable threshold within the input AC voltage range for initiating the power limiting. The selectable threshold enables choices to be made, for example, in combining more expensive, more robust components and less expensive, less robust components to satisfy design requirements associated with one or more of the performance criteria noted above.

Moreover, further flexibility in design can be provided in accordance the the inventive arrangements taught herein by utilizing a negative voltage for establishing the threshold, as compared to the positive voltage utilized previously.

A method in accordance with the inventive arrangements for operating a switched mode power supply can advantageously comprise the steps of: receiving a primary supply voltage; repetitively coupling the primary supply voltage to a load and uncoupling the primary supply voltage from the load; energizing a secondary voltage supply responsive to the coupling and uncoupling step; sensing a magnitude of each occurrence of a current flowing during the coupling and uncoupling step; controlling the coupling and uncoupling step at least in part responsive to the sensing step; generating a sense voltage proportional to the primary supply voltage; and, limiting output power of the power supply by increasing the sensed magnitude of each the occurrence of the flowing currents whenever the sense voltage exceeds a threshold.

The method can advantageously further comprise one or more of the following steps: increasing the sensed magnitude of each the occurrence of the flowing currents by a factor proportional to the sense voltage; or, controlling the coupling and uncoupling step responsive to the sensing step and responsive to the energizing step.

The method can advantageously further comprise the following steps: receiving a primary alternating current (AC) supply voltage; generating a voltage signal related to each sensed magnitude of the flowing currents; generating the sense voltage responsive to negative portions of the AC supply voltage; and, whenever the sense voltage exceeds the threshold: increasing each the voltage signal in magnitude by a factor proportional to the sense voltage; and, controlling the coupling and uncoupling step at responsive to the increased magnitude voltage signals and responsive to the energizing step.

A switched mode power supply according to the inventive arrangements can advantageously comprise: a source of a primary supply voltage; a switch for repetitively coupling the primary supply voltage to a transformer and uncoupling the primary supply voltage from the transformer; a secondary voltage supply coupled to the transformer and energized by operation of the switch; a resistance for sensing a magnitude of each occurrence of a current flowing during the operation of the switch; a controller for the switch forming part of a negative feedback loop and responsive at least in part to the sensed magnitudes; a sense voltage source proportional to the primary supply voltage; and, a circuit operable when the sense voltage exceeds a threshold for combining the sensed magnitude of each the occurrence of the flowing currents and a supplemental voltage proportional to the sense voltage, for limiting output power of the power supply.

The switched mode power supply can further comprise the controller for the switch being responsive to the sensed magnitudes and being responsive to operation of the secondary voltage supply.

In those cases where the primary supply voltage is an alternating current (AC) supply voltage, the sense voltage can be advantageously generated responsive to negative portions of the AC supply voltage.

The switched mode power supply can advantageously further comprise: a first diode for rectifying the negative portions of the AC supply voltage; a capacitor responsive to the rectified voltage for developing the sense voltage; and, a Zener diode having a breakdown voltage establishing the threshold.

BRIEF DESCRIPTION OF THE DRAWINGS

FIG. 1 is a first section of a current mode controlled switched mode power supply according to the inventive arrangements.

FIG. 1(a) illustrates the relationship between two grounds in the power supply, Z and M1.

FIG. 1(b) illustrates the relationship between ground M1 and two voltage supplies, +12V Standby (SB) and +12V.

FIGS. 2 and 3 each include transformer LP102 and opto-coupler DP302 for purposes of establishing continuity between FIGS. 2 and 3.

DETAILED DESCRIPTION OF THE PREFERRED EMBODIMENTS

Generally, the magnitude of the current switched in a current mode controlled switched mode power supply is monitored by measuring the voltage developed across a current sensing resistor. When the sensed voltage reaches a threshold set by the control circuit or the power supply, the power switching device is turned off until the start of the next cycle.

An offset voltage proportional to the AC input voltage can be added to the sensed voltage, which in effect lowers the threshold at which the control circuit turns off the switching device as the AC input voltage rises.

In accordance with the inventive arrangements, further control and design flexibility is advantageously provided by enabling a threshold to be selected and established at which the power limiting is initiated, apart from the normal feedback operation of the control circuit responsive to the combination of the sensed voltage and the offset voltage. Component values and component power capacities of the power supply can be selected, for example, so that a constant overload power can be maintained independent of the AC input voltage.

A power supply 1 is shown in FIGS. 1, 1(a), 1(b), 2 and 3. The manner in which the various sections of the power supply are divided between the Figures is based on convenience of illustration.

FIG. 1 shows a first section 10 of a current mode controlled switched mode power supply 1 according to the inventive arrangements. Section 10 of the power supply generates two output voltages response to an AC voltage input mains supply, RAW B+ and LO B+. There are four grounds in the power supply, designated Z, M, M1 and M2. In FIG. 1(a) circuit 10A illustrates the relationship between grounds Z and M1. In FIG. 1(b) circuit 10B illustrates the relationship between ground M1 and two voltage supplies developed in the third section in FIG. 3, +12V Standby (SB) and +12V.

Figure 2:
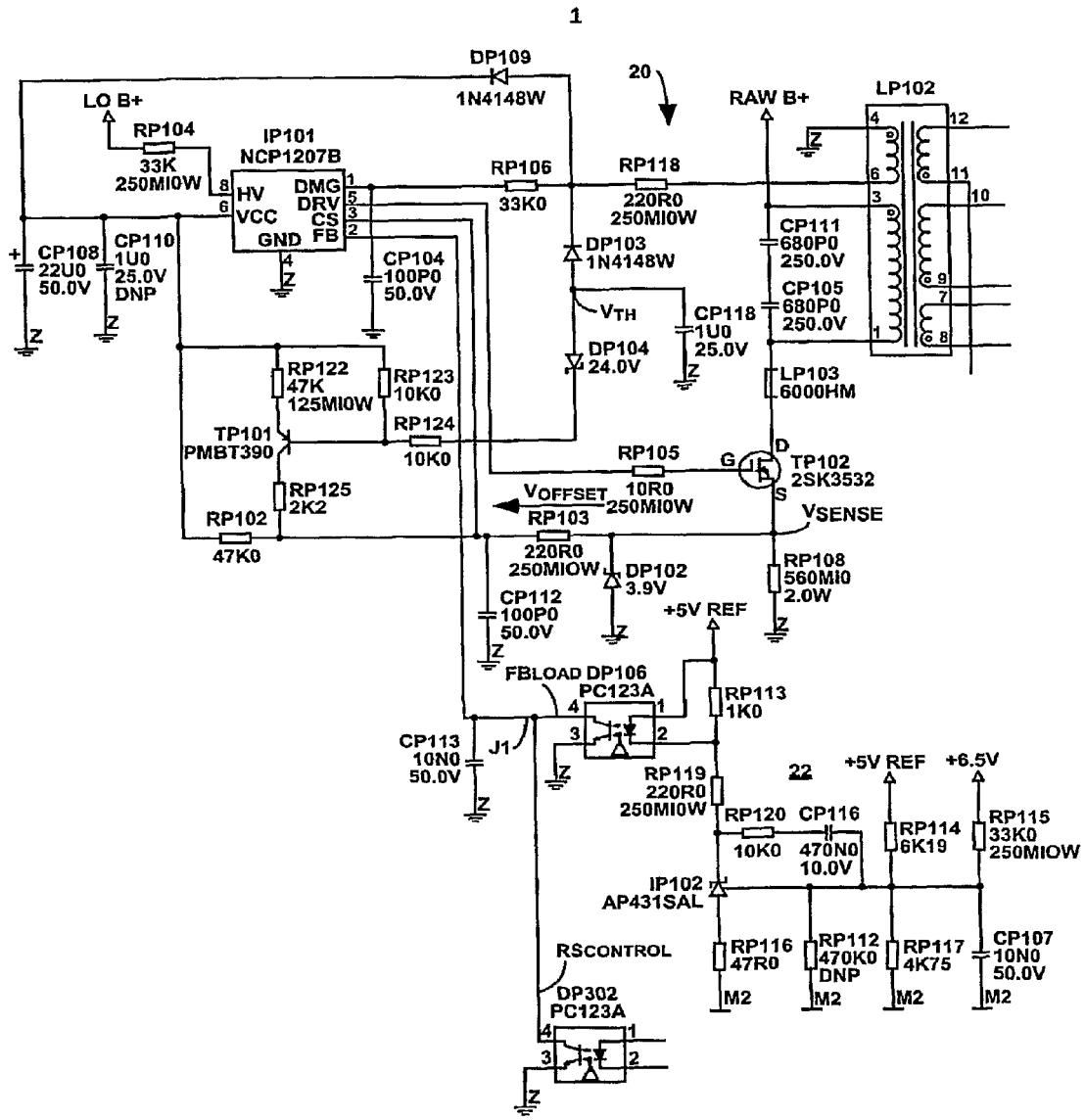
FIG. 2 is a second section of the power supply.

FIG. 2 show a second portion 20 of the power supply 1. Second portion 20 receives the LO B+ and RAW B+ voltages generated in first portion 10.

Figure 3:
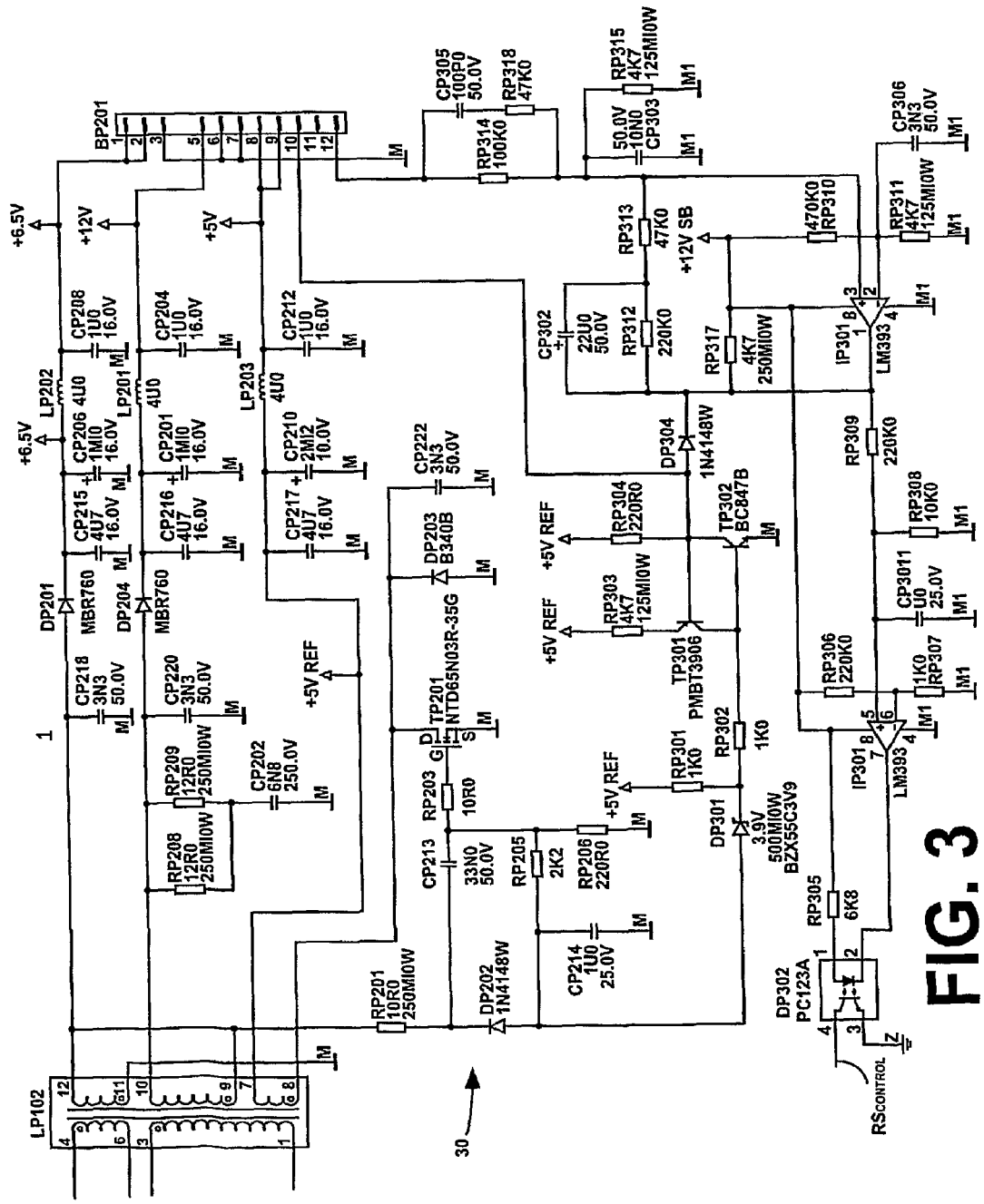
FIG. 3 is a third section of the power supply.

FIG. 3 shows a third portion 30 of the power supply 1, in which a plurality of secondary voltages are generated. Both transformer LP102 and opto-coupler DP302 are shown in portions 20 and 30 to facilitate the description of the power supply.

Portion 30 supplies a first feedback control signal to integrated control circuit IP101 in portion 20 through opto-coupler DP302. A second opto-coupler DP106 in portion 20 supplies a second feedback control signal to control circuit IP101.

Isolation barriers are created by transformer LP102, opto-coupler DP302 and opto-coupler DP106. The circuitry 22 in portion 20 is isolated from the rest of the circuitry in portion 20 and isolated from the circuitry in portions 10 and 20. Ground for that part 22 of the circuitry is designated M2.

With reference to FIG. 2 and portion 20 of the mode current mode controlled switching power supply 1, the input voltage Raw B+ generated in portion 10 provides the main source of energy for the power supply. Transformer LP102 provides output voltages that are rectified and filtered in portion 30 to generate a plurality of low voltage outputs. Integrated circuit IP101 is a control IC that provides a pulse-width modulated output signal used to switch the power device TP102. In the presently preferred embodiment, IP101 is an ON Semiconductor® NCP1207B current mode modulator manufactured by Semiconductor Components Industries, LLC. A Data Sheet is available as Publication Order Number: NCP1207A/D, October, 2006—Rev. 3.

The pins of the NCP1207B current mode modulator are associated with the following functions. The DMG pin 1 receives an auxiliary flyback signal that ensures discontinuous operation and offers a fixed over-voltage detection level of 7.2V. When FB pin 2 is connected to an opto-coupler the peak current set point is adjusted according to the output power demand. Bringing pin 2 below an internal skip level shuts off the device. The CS pin 3 senses the primary current and routes it to an internal comparator. Inserting a resistor in series with pin 3 enables control of the level at which the skip operation takes place. The GND pin 4 is ground. The DRV pin 5 is the driver's output to an external MOSFET. The Vcc pin 6 is connected to an external bulk capacitor. The NC pin 7 is unconnected. The HV pin 8 is connected to the high voltage rail and injects a constant current into the VCC bulk capacitor.

Resistor RP108 is a current sense resistor that provides a voltage $V_{SENSE}$ proportional to the current flowing through transformer LP102 and transistor TP102. The sensed voltage $V_{SENSE}$ is coupled to pin 3 (CS) of the control IC IP101. During normal operation, when this voltage reaches a given threshold at the input to the control IC, the output of IP101 on pin 5 (DRV) goes low and turns off transistor TP102 until the next cycle begins. If the system requires more power, the threshold voltage level in IP101 is increased so that more energy is stored in LP102 (higher peak current) and more power is delivered to the output windings. The threshold voltage has a maximum value that limits the maximum output power that is available. Component LP103 is a ferrite bead.

The selectable threshold for initiating power limiting in accordance with the presently preferred embodiment of the inventive arrangements is explained with further reference to portion 20 in FIG. 2. Pin 6 of transformer LP102 provides an AC voltage that is coupled through resistor RP118 to a number of destinations. Diode DP109 couples the voltage to capacitors CP108 and CP110, which become charged and form a supply voltage coupled to the Vcc input pin 6 of IC IP101. This voltage is further coupled to resistors RP102, RP122, RP123 and RP124 to bias the operation of transistor TP101. The positive portion of the voltage from pin 6 of transformer LP102 becomes the regulated voltage as coupled to the DMG input pin 1 of IC IP101. The negative portion of the AC voltage from pin 6 of transformer LP102 is coupled to the cathode of diode DP103. This negative portion of the AC voltage is unregulated and is proportional to the input voltage Raw B+. The anode of diode DP103 is coupled to the anode of Zener diode DP104 and to capacitor CP118, the other end of which is coupled to ground. Diode DP103 rectifies the negative portion of voltage from pin 6 of transformer LP102 and creates a negative supply voltage $V_{TH}$, which is filtered by capacitor CP118 and which varies with the Raw B+ voltage. When the negative supply voltage $V_{TH}$ reaches a value that causes Zener diode DP104 to conduct, a voltage is developed at the base of transistor TP101 that causes current to flow in the collector. This collector current in turn flows through resistors RP125 and RP103 causing a voltage $V_{OFFSET}$ to be developed across resistor RP103 that artificially increases the current sense voltage. In other words, less current is allowed to flow through sense resistor RP108 for a given threshold voltage set in IP101. Resistor RP122 controls the gain of the circuit and resistor RP125 determines the maximum reduction of current that is possible. The breakdown voltage of Zener diode DP104 determines the voltage level, that is, the voltage threshold, at which the power limiting begins. In the presently preferred embodiment illustrated in the drawings, the power supply has been optimized to provide a combination of sufficient load capacity, reduced cost, reduced size and efficiency in operation. The presently preferred embodiment is suitable, inter alia, for a digital set top box, in which the Zener breakdown voltage is 24 volts. The voltage threshold can be advantageously and easily adjusted by substituting a Zener diode with a different breakdown voltage. Consequently, the power supply can be advantageously redesigned, in terms of balancing the performance factors, such as load capacity, reduced cost, reduced size and efficiency in operation as noted above.

Most of the circuitry shown in portion 30 of FIG. 3 generates secondary low voltage power supplies of +5V, +6.5V, +12V, +12V SB (Standby) and +5V Ref (Reference). The +5V, +6.5V and +12V supplies are routed from the power supply though connector BP201. One section of portion 30 supplies the input to opto-coupler DP302, the operation of which is explained below.

There are additional feedback and control signals supplied to IC IP101. A feedback signal $FB_{LOAD}$ is generated as the output of opto-coupler DP106. A control signal $RS_{CONTROL}$ is generated as the output of opto-coupler DP106. The outputs of the two opto-couplers are coupled to one another at the junction J1 of pin 4 of opto-coupler DP302, pin 4 of opto-coupler DP106, capacitor CP113 and FB pin 2 of control IC IP101.

The feedback signal $FB_{LOAD}$ is related to the output power demand of the power supply loads. Circuit 22 monitors the +6.5V voltage supply. Device IP102 in circuit 22 is a reference amplifier used to control the output voltage of the power supply. Reference amplifier IP102 contains a fixed 2.5V reference and an amplifier that causes increased current to flow in the cathode of the device as the input voltage increases above the reference voltage. When current flows through the cathode of the device, the current also flows in series with the diode part of opto-coupler DP106. Current flowing in the diode part of opto-coupler DP106 causes a current to flow in the transistor side of opto-coupler DP106, thus causing the control IC IP101 to reduce the power supplied to the transformer.

A peak current set point in control IC IP101 is responsive to the feedback signal $FB_{LOAD}$ and the peak current is thus controlled according to the output power demand. During normal operation, control IC IP101 responds to signals on DMG pin 1 and CS pin 3. Output power is limited outside the control of IC IP101 only when threshold voltage $V_{TH}$ is exceeded, during which the signal on CS pin 3 is increased by offset voltage $V_{OFFSET}$.

The control signal $C_{CONTROL}$ is used to shut down the power supply as part of a reset function. Control signal $C_{CONTROL}$ is used as an on/off signal, as compared to feedback signal $FB_{LOAD}$, which is a voltage feedback used for regulation purposes. When the diode in opto-coupler DP302 conducts, the control signal $RS_{CONTROL}$ pulls down the common junction J1 to or toward ground, interrupting the feedback signal $FB_{LOAD}$. When the voltage at FB pin 2 of control IC IP101 is pulled below an internal skip level inside the control IC IP101, the switching device transistor TP102 is turned off until opto-coupler DP302 turns off and the voltage at junction J1 is again responsive to feedback signal $FB_{LOAD}$.

It can be seen that the normal operation and safety protocols built into the control IC are advantageously not adversely affected by the threshold initiated power limiting in accordance with the inventive arrangements.

The invention claimed is:

1. A method for operating a switched mode power supply, comprising the steps of:
   receiving a primary supply;
   repetitively coupling said primary supply voltage to an impedance and uncoupling said primary supply voltage from said impedance;
   energizing a secondary supply responsive to said coupling and uncoupling step;
   sensing a magnitude of a repetitive occurrence of a current flowing during said coupling and uncoupling step;
   controlling said coupling and uncoupling step at least in part responsive to said sensing step;
   generating a sense voltage related to said primary supply; and,
   limiting output power of said power supply by increasing the sensed magnitude of said occurrence of said flowing currents whenever said sense voltage exceeds a threshold.

2. The Method of claim 1, further comprising the step of increasing the sensed magnitude of each said occurrence of said flowing currents by a factor proportional to said sense voltage.

3. The method of claim 2, further comprising the step of controlling said coupling and uncoupling step responsive to said sensing step and responsive to said energizing step.

4. The method of claim 1, further comprising the step of controlling said coupling and uncoupling step responsive to said sensing step and responsive to said energizing step.

5. The method of claim 1, comprising the steps of:
   receiving a primary alternating current (AC) supply voltage;
   generating a voltage signal related to each sensed magnitude of said flowing currents;
   generating said sense voltage responsive to negative portions of said AC supply voltage; and,
   whenever said sense voltage exceeds said threshold:
      increasing each said voltage signal in magnitude by a factor proportional to said sense voltage; and,
      controlling said coupling and uncoupling step at responsive to said increased magnitude voltage signals and responsive to said energizing step.

6. A switched mode power supply, comprising:
   a source of a primary supply;
   a switch for repetitively coupling said primary supply voltage to a transformer and uncoupling said primary supply voltage from said transformer;
   a secondary voltage coupled to said transformer and energized by operation of said switch;
   a resistance for sensing a magnitude of a repetitive occurrence of a current flowing during said operation of said switch;
   a controller for said switch forming part of a negative feedback loop and responsive at least in part to said sensed magnitudes;
   a sense voltage source related to said primary supply; and,
   a circuit operable when said sense voltage exceeds a threshold for combining the sensed magnitude of said occurrence of said flowing currents and a supplemental voltage related to said sense voltage, for limiting output power of said power supply.

7. The switched mode power supply of claim 6, wherein said controller for, said switch is responsive to said sensed magnitudes and is responsive to operation of said secondary supply.

8. The switched mode power supply of claim 7, wherein:
   said primary supply is an alternating current (AC) supply voltage; and,
   said sense voltage is generated responsive to negative portions of said AC supply voltage.

9. The switched mode power supply of claim 8, wherein said circuit comprises:
   a first diode for rectifying said negative portions of Said AC supply voltage;
   a capacitor responsive to said rectified voltage for developing said sense voltage; and,
   a Zener diode having a breakdown voltage establishing said threshold.

10. The switched mode power supply of claim 6, wherein said circuit comprises:
    a first diode for rectifying portions of said primary supply;
    a capacitor responsive to said rectified portions for developing said sense voltage; and,
    a Zener diode having a breakdown voltage establishing said threshold.

11. The switched mode power supply of claim 10, wherein:
    said primary supply is an alternating current supply voltage; and,
    said first diode rectifies negative portions of said supply voltage.

* * * * *